A. H. NELLER.
COMBINED TROLLEY AND HOIST.
APPLICATION FILED JULY 19, 1920.
1,380,830.
Patented June 7, 1921.
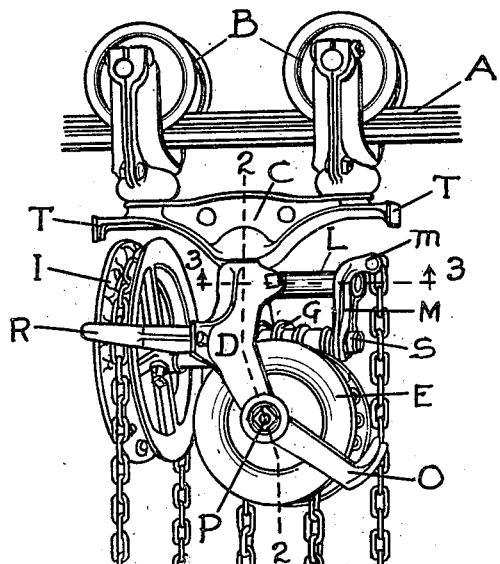
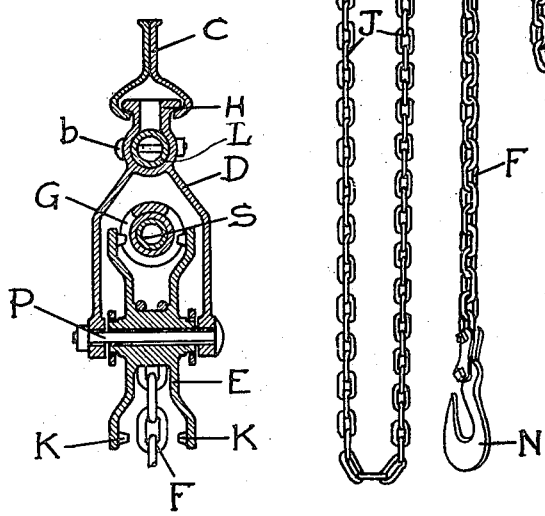
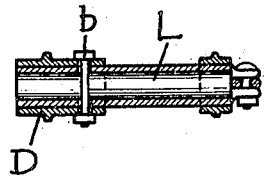
INVENTOR
Albert H. Neller.
BY William Louden.
ATTORNEY

UNITED STATES PATENT OFFICE.

ALBERT H. NELLER, OF FAIRFIELD, IOWA, ASSIGNOR TO THE LOUDEN MACHINERY COMPANY, OF FAIRFIELD, IOWA, A CORPORATION OF IOWA.

COMBINED TROLLEY AND HOIST.

1,380,830.  Specification of Letters Patent.  Patented June 7, 1921.

Application filed July 19, 1920. Serial No. 397,284.

*To all whom it may concern:*

Be it known that I, ALBERT H. NELLER, a citizen of the United States, residing at Fairfield, in the county of Jefferson and State of Iowa, have invented a new and useful Improvement in Combined Trolleys and Hoists, of which the following is a specification.

My invention relates to that class of devices designed to hoist and carry merchandise or other things from one place to another by a hoist connected to a trolley designed to run on an overhead track, and it consists of a combination and arrangement of the hoist and trolley whereby the entire apparatus is combined in one structure, and of other features hereinafter set forth and more specifically defined in the claims.

In the accompanying drawings, forming a part of this specification, Figure 1 is a side elevation, partly in perspective, of a combined trolley and hoist embodying my invention. Fig. 2 is a vertically disposed transverse section on line 2—2 of Fig. 1. Fig. 3 is a horizontally disposed transverse section on line 3—3 of Fig. 1 looking in the direction of the arrow.

Referring to the drawings, A represents a section of overhead track to be supported in position in any suitable manner, (supporting devices not shown), and B represents trolleys to run on the track. The trolleys are preferably used in pairs joined together by a suitable connecting member C, to which the trolley frames are preferably swiveled whereby they may be turned to run over curved tracks or on deflected switches. D represents the frame of the hoist which is joined to the connecting member C by a swivel head H, as shown in Fig. 2, so that it may be turned at an angle to the member C or be placed in reversed position thereto.

E represents a sprocket wheel which is rotatably mounted in the frame D, and F is a hoisting chain passed over the sprocket wheel. A rotatable shaft S carrying a screw or worm gear G is journaled in the frame D adjacent to the periphery of the sprocket wheel E. On one end of the shaft S is a chain wheel I carrying a hand chain J. By moving the hand chain in one direction or the other the chain wheel and the shaft S on which it is mounted together with the screw or worm gear G, will be rotated, and the screw meshing in gears or lugs K on adjoining portions of the sprocket wheel E will rotate the wheel and elevate or lower the hoisting chain F together with the load that may be connected to it.

Above the shaft S, and horizontally parallel with it is a member L, preferably a piece of tubing or shaft, which is rigidly affixed to the frame D, which may be by a bolt *b*, as shown in Figs. 2 and 3. It is also preferable that the inner end of the piece of tubing or bar L be inserted in the frame D, or in recesses on the inner mating faces of the parts comprising the frame as shown in Figs. 2 and 3. On the outer end of the fixed member L, a downwardly depending bracket M is secured, and in the lower end of this bracket the rotatable shaft S is journaled. The upper end *m* of the bracket M above the member L is preferably extended horizontally outward and the upper end of the chain F is attached to said outwardly extended end of the bracket. A hook N, or an equivalent load attaching device, is affixed to the lower end of the chain F.

O represents a guard pivoted to the frame D on or near the axle P upon which the sprocket wheel is mounted. This guard is preferably made U-shaped so as to straddle the sprocket wheel and to be pivoted on opposite sides thereof. Its central portion is preferably broadened and slightly bifurcated to come in contact with the adjacent portion of the chain F. When the hook N is lowered by the rotation of the sprocket wheel E, the portion of the chain F forming the loop Q, will come in contact with the central portion of the guard and the continued movement of the chain will cause the guard to be drawn upward until its central portion will come in contact with the lower end of the bracket M, or with the outstanding end of the shaft S, when the further movement of the chain in that direction will be arrested. The purpose of the guard O is to prevent the chain from being drawn up too far against or beyond the shaft S where it would be liable to become wedged or stuck fast. Also to assist in starting the downward movement of the loop of the chain.

When the movement of the chain is reversed and the portion forming the loop Q is lowered, the guard O will drop back to the position shown in Fig. 1. R represents a guard to prevent the hand chain J from getting off the chain wheel I, and T represents extended bumpers to come in contact with similar devices on other trolleys running on the same track, whereby the trolley wheels will be prevented from running against each other.

What I claim is:

1. The combination of a trolley adapted to run on an overhead track, a hoisting device having a frame connected to the trolley, a rotatable shaft having means adapted to operate the hoisting device mounted in said frame, a horizontally disposed fixed member having its inner end inserted in the frame above the rotatable shaft, its outer end being extended in a line approximately parallel with the rotatable shaft, and a downwardly depending bracket secured to the outer end of said member, and the outer end of the rotatable shaft journaled in the lower end of the bracket.

2. The combination of a trolley adapted to run on an overhead track, a hoisting device having a frame connected to the trolley, a rotatable shaft having means adapted to operate the hoisting device mounted in said frame, a horizontally disposed member having its inner end affixed to the frame above the rotatable shaft, its outer end being extended in a line approximately parallel with the shaft, a chain adapted to pass over the hoisting device, and a downwardly depending bracket secured to the outer end of the member and having its lower end adapted to support the outer end of the rotatable shaft and its upper end adapted to support one end of the chain.

3. The combination of a trolley adapted to run on an overhead track, a downwardly depending frame pivotally connected to the trolley, a sprocket wheel rotatably mounted in the frame, a chain adapted to pass over the sprocket wheel, a rotatable shaft having means to operate the sprocket wheel mounted in the frame, a horizontally disposed member having its inner end affixed to the frame above the rotatable shaft, its outer end being extended in a line approximately parallel with the shaft, and a downwardly depending bracket secured to the outer end of the member and having its lower end adapted to support the outer end of the rotatable shaft and its upper end adapted to support one end of the chain.

4. The combination of a trolley adapted to run on an overhead track, a downwardly depending frame pivotally connected to the trolley, a sprocket wheel rotatably mounted in the frame, a chain adapted to pass over the sprocket wheel, a rotatable shaft having means to operate the sprocket wheel mounted in the frame, a horizontally disposed member having its inner end affixed to the frame above the rotatable shaft, its outer end being extended in a line approximately parallel with the shaft, and a downwardly depending bracket secured to the outer end of the member and having its lower end adapted to support the outer end of the rotatable shaft and its upper end extended out beyond the end of the member to support one end of the chain.

Fairfield, Iowa, July 15th, 1920.

ALBERT H. NELLER.